Figure 1:
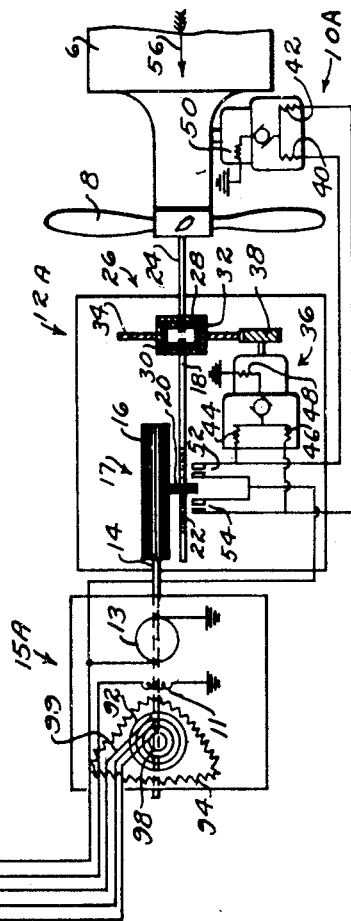
Figure 1:
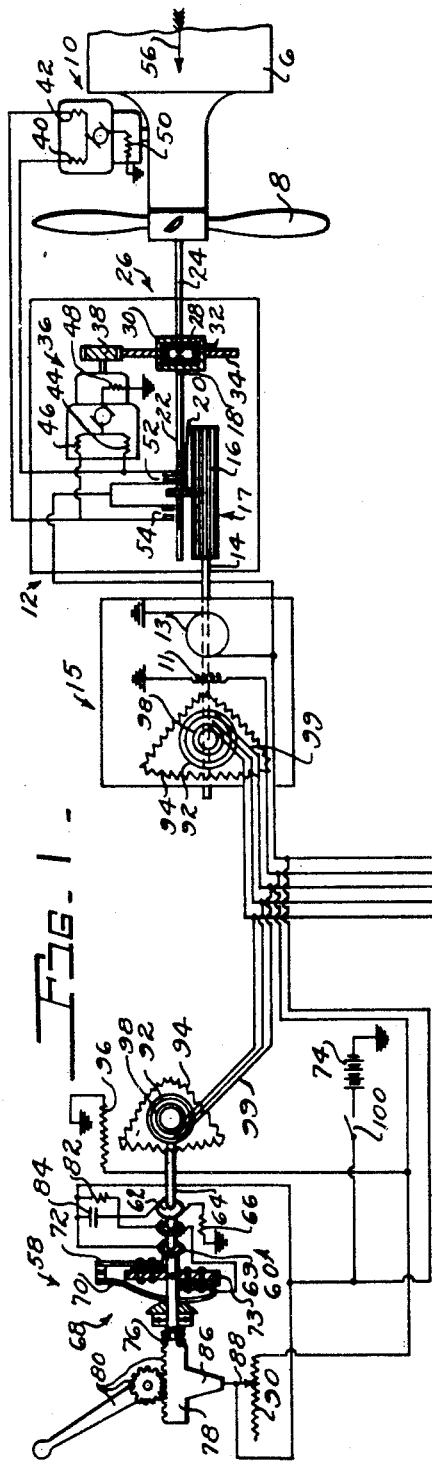

Dec. 24, 1946.  H. M. McCOY  2,413,028
ENGINE SYNCHRONIZER
Filed March 11, 1944    2 Sheets-Sheet 1

INVENTOR
HOWARD M. McCOY
BY
ATTORNEYS

Dec. 24, 1946.  H. M. McCOY  2,413,028
ENGINE SYNCHRONIZER
Filed March 11, 1944  2 Sheets-Sheet 2

INVENTOR
HOWARD M. McCOY
BY
ATTORNEYS

Patented Dec. 24, 1946

2,413,028

UNITED STATES PATENT OFFICE 2,413,028

ENGINE SYNCHRONIZER

Howard M. McCoy, Patterson Field, Ohio

Application March 11, 1944, Serial No. 526,103

9 Claims. (Cl. 172—293)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to synchronizers, the adaptation shown being directed particularly to maintaining the reference members of a plurality of differential governor mechanisms in synchronism.

In my copending application Serial No. 475,297, filed February 9, 1943, I show a differential governor mechanism wherein a small reference motor, which is adapted to remain constant at any selected speed within its range, drives the reference member of the differential governor, the variable speed member being drivably connected to the power unit whose speed is to be controlled, the differential governor also including servo mechanism operative by off-speed conditions of the power unit with respect to the reference motor to actuate the speed changing controls of the power unit so as to bring it back to speed.

The present invention as one object contemplates the combining of a plurality of differential governors of the kind above indicated, with a novel means for maintaining the small reference motors of the several differential governors in perfect synchronism to the end that the differential governors may likewise maintain the power units which are being controlled by the governors in perfect synchronism.

Conventional aircraft engine synchronizers usually comprise a reference motor in the cockpit, to which the speeds of the several engines are transmitted and differentiated, where necessary, with the reference speed, then different corrective signals, each appropriate to the off-speed condition of a particular engine, must be transmitted back to the several engines to change the propeller pitch thereby to bring the speed of all of the engines into synchronism with the reference speed in the cockpit.

It is therefore another object of this invention to simplify conventional practice by providing a relatively small reference motor at each engine, and synchronizing the several small reference motors, whereby there may be, close to each engine, a complete control unit comprising a small reference motor, a differential governor, and the necessary servo mechanism operated by the differential governor to control the engine speed.

Synchronizers are also known wherein one engine is selected as the reference engine, and that engine provided with an alternating current generator large enough to operate a series of smaller synchronous motors, one on each of the remaining engines, whereby the respective engine governors each has a reference motor with which to synchronize its engine. This arrangement, however, requires an alternating current generator of considerable size, depending, of course, on the number of engines to be synchronized.

It is therefore another object of this invention to simplify a mechanism of this character by providing, in addition to a small direct current master motor which will remain constant at a manually selected speed, a small direct current reference motor for each engine, synchronizing all of these direct current reference motors, as nearly as may be, to the selected speed of the master motor by so regulating their field strength that it will always be a function of the selected master motor speed, then correcting any remaining off-speed conditions in the several small direct current motors by placing, on each direct current armature shaft, a small alternating current rotor with polyphase winding, and connecting the several windings in phase relationship.

Other objects and advantages will appear as the invention is described in greater detail and reference is made to the drawings, wherein—

Figure 2:
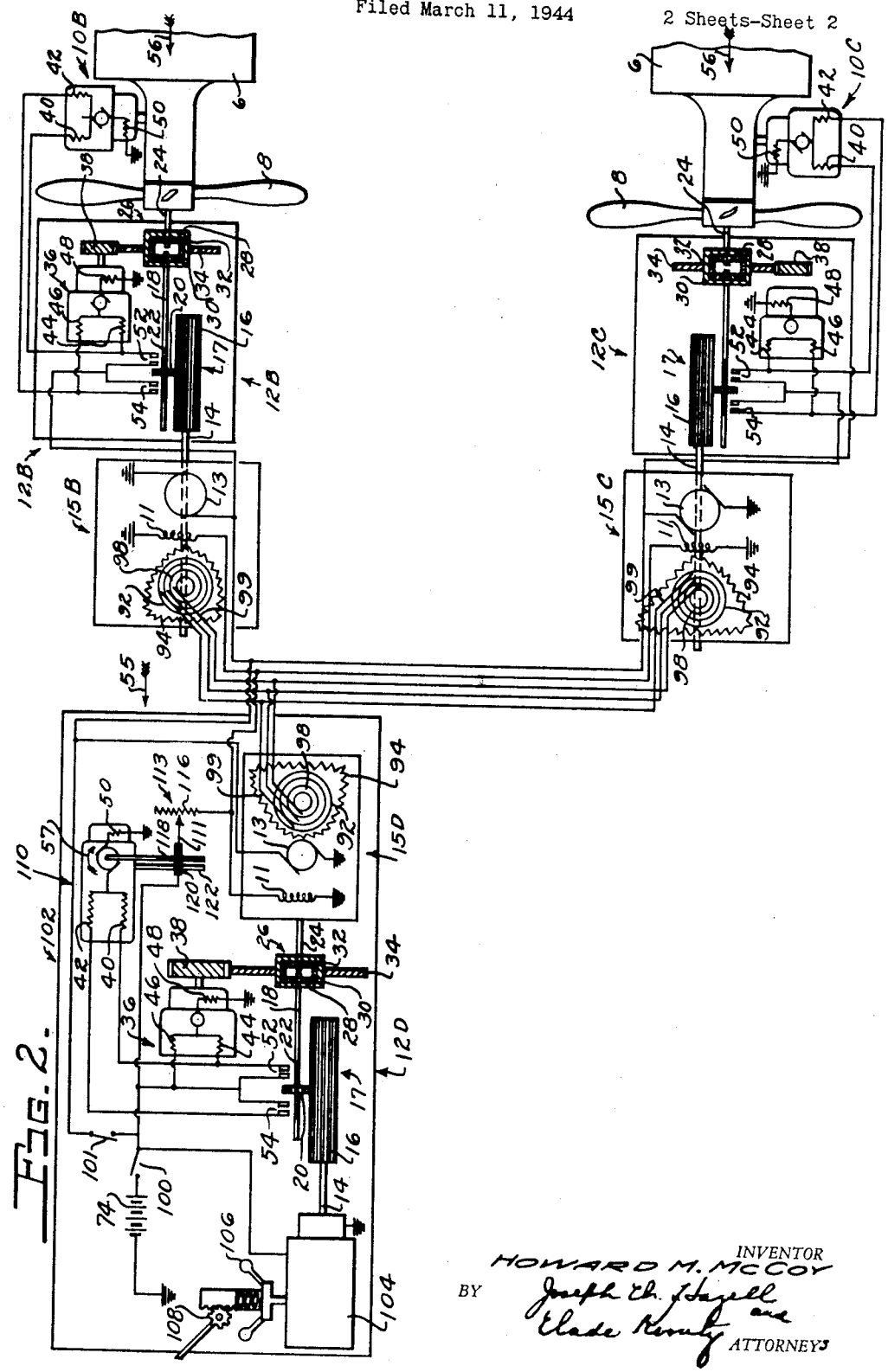

Figs. 1 and 2 are schematic views of two exemplifications of the invention.

Referring now to Fig. 1, a series of aircraft engines 6 (two only being shown), each has a propeller 8, the pitch of which is varied by a servomotor 10 or 10A, the rotation of the servomotor being controlled by differential governor units 12 or 12A.

The differential governor as seen at 12 or 12A is shown, described, and claimed in my copending application Serial No. 475,297, filed February 9, 1943. In this governor, a shaft 14, which must emanate from some constant speed source, as, for instance, from a small motor 15 or 15A, carries the elongated pinion 16, and, parallel to shaft 14, is another shaft 18 which carries the narrow pinion 20, the pinions 16 and 20 being in mesh one with the other. The shaft 18 is externally threaded at 22 and the pinion 20 is internally threaded to correspond. The differential between the controlling shaft 14 and the controlled shaft 18 being evidenced by the movement of the pinion 20 on the screw 22, this type of differential is known as a screw-and-pinion differential, as distinguished from a gear differential, and may be broadly referred to by numeral 17.

Reference motors 15 and 15A are of the shunt D. C. type, having a shunt field 11, and an armature 13 which may be built directly on the shaft 14, as shown, or on a separate shaft which is drivably connected to the shaft 14.

A shaft 24 is placed end to end and in axial alignment with the shaft 18. Shaft 24 may emanate from the propeller and rotate at propeller speed, or at a speed which is a function of propeller speed.

A gear differential 26 surrounds the adjacent ends of the shafts 18 and 24, one of the bevel differential gears 28 being fast on each shaft. A differential pinion carrier 30 rotatably supports the bevel differential pinions 32 and keeps them in mesh with the differential gears 28. A spur gear 34 is fast on the outside of the carrier 30.

A follow-up motor 36 carries a spur pinion 38 which is in mesh with the gear 34, whereby rotation may be imparted to the differential carrier 30. Obviously, as long as there is no rotation of the carrier 30 by the motor 36, the shafts 18 and 24 will rotate oppositely and at the same speed. It is equally obvious that as long as the shafts 18 and 14 rotate at exactly the same speed, the pinion 20 will remain in the position shown, but will move axially in one or the other direction whenever the speed of the shaft 18 is greater than or less than that of the reference shaft 14. Servomotor 10 has oppositely wound field coils 40 and 42 while follow-up motor 36 has oppositely wound field coils 44 and 46, whereby either motor may be made to rotate in either direction by connecting the proper field coil in series with the armature. Both motors also have a brake to arrest rotation, the brake being normally spring engaged but being disengageable by solenoids 48 and 50, whenever current is supplied to the motor windings to cause rotation. Of the parts of these brake mechanisms, only the solenoids for releasing them are shown. Two switches 52 and 54 are interposed in the path of the pinion 20 for closing the electric circuits to the motors 10 and 36.

If, looking in the direction of the arrow 56, the engine 6 rotates clockwise, the shaft 24 will rotate clockwise and the shaft 18 anti-clockwise. If the shaft 18 is rotating at exactly the speed of the reference shaft 14, the pinion will not move axially. If the engine 6 overspeeds, the thread 22 being left-hand, the pinion 20 will move to close the switch 52 which will energize the coil 40 of the servomotor 10 for pitch increase, the coil 44 of the follow-up motor 36 being coincidentally energized for returning the pinion 20, by means of the differential 26, to the neutral position shown. If the engine underspeeds, the pinion 20 will move to close the switch 54, which will energize the coil 42 of the servomotor 10 for pitch decrease, the coil 46 of the follow-up motor 36 being coincidentally energized for returning the pinion 20 to the neutral position. It will, of course, be understood that, if the follow-up motor 36 and the differential gear 26 were eliminated, the governor 12 would still operate, but in that case the pinion 20, having, for instance, been moved by engine overspeed to close the switch 52, would not be moved back to the neutral position except by an engine underspeed condition, with the result that considerable hunting would be experienced. Hereinafter when the term differential governor is used it is intended to refer to the combination of parts comprising the reference shaft 14, the screw-and-pinion differential 17, the gear differential 26, the servomotor 10, the follow-up motor 36 and the controlled shaft 24.

The foregoing described unit consisting of an engine, differential governor and reference motor is not new in this application but is included as a basis for showing how a plurality of similar reference units may be synchronized with a manually variable speed master unit hereinafter described. The units 10A, 12A and 15A are duplicates of 10, 12 and 15 but are given the distinguishing reference characters to facilitate subsequent description of their operation.

In the selector unit which may be broadly designated by the numeral 58, a small D. C. master motor 60 comprises an armature 62, which is fast on a shaft 64, and a field coil 66, one side of which is connected to the armature winding, the other side being grounded.

A spring loaded governor 68 has contact members 70 and 72 which are carried on a disc 73, the disc being fast on the shaft 64 and the contact members being insulatedly secured thereto. A slip ring 69 transmits current brought from the battery 74 to the insulated contact 72. The contact members 70 and 72 are so formed and positioned on the disc 73 that their free ends tend to be separated by centrifugal force upon rotation of the shaft 64. A spring 76 is biased to maintain the contact members in the closed position. A spring tensioning member 78 is provided for varying the stress of the spring 76. Member 78 has a lever operated rack and pinion arrangement 80 whereby the tension of spring 76 may be varied manually. The circuit from the battery through the master motor 60 by way of the closed contacts 70—72 is of relatively low resistance. A parallel circuit of higher resistance is provided, by way of a resistance element 82, through which a lesser current will be supplied the master motor 60 when its rotative speed becomes high enough to cause the contact members 70 and 72 to separate. A condenser 84 is included to modify contact point arcing.

An arm 86 extends from the spring tensioning member 78 and carries the movable contact 88 of a rheostat 90 through which current from the battery 74 passes to the field coils 11 of the shunt D. C. reference motors 15, 15A, etc. Operation of the manual selector mechanism 78—80 one way or the other will therefore raise or lower the speed of the series D. C. master motor 60 through the governor 68, and will coincidentally raise or lower the speed of the shunt D. C. reference motors 15, 15A, etc., by varying the field coil strength. By careful attention to the design of these parts, an entire series of shunt reference motors 15 may be maintained relatively close to synchronism, one with the other, and the entire series with the manually controlled series master motor 60. However, since exact synchronism between these motors is required, a relatively simple additional mechanism is required. This additional mechanism, which will now be described, constitutes a valuable feature of the invention.

Fast on the armature shaft 64 of the series D. C. master motor 60, is an A. C. rotor 92 having a polyphase winding 94. An exact duplicate of the wound rotor 92 is carried on each and every shaft 14 of the shunt D. C. motors 15, 15A, etc. That one of the A. C. rotors 92, which is carried on the shaft 64, is shown as being provided with a separate field coil 96, but a suitable field may be provided for the rotor 92 by modifying the coil 66 of the series motor 60, whereby the separate field coil 96 may be omitted. The A. C. rotors 92 on the shafts 14 are energized by the field coils 11. The windings 94 neither receive current from, nor deliver current to, any outside line, but are connected only one to the other. Slip rings 98 and brushes 99 are provided for this purpose. A main switch 100 is provided for separating the battery 74 from the windings. The operation of the device of Fig. 1 should be clear without much additional explanation. The operation is as follows:

The switch 100 is closed and the manually operable control 78—80 set for the desired master speed. The rheostat 90 will coincidentally adjust the strength of the field coils 11 for producing the selected speed in the shunt D. C. reference motors 15, 15A, etc. When the master motor 60 reaches the speed selected, the contacts 70 and 72 will separate, whereupon the battery will momentarily supply current to the master motor 60 through the higher resistance path which includes the resistance 82. This lowers the speed of the governor 68 which brings the contacts 70 and 72 back together again. This cycle is repeated as much as four hundred times per second, whereby the speed of the master motor 60 remains substantially constant at the speed to which it is set, and the shunt D. C. reference motors 15, 15A, etc., take the same speed due to the proper adjustment of their field strength by the rheostat 90.

Without the A. C. rotors 92, however, the shunt D. C. motors 15, 15A, etc., would likely not remain closer to synchronism with each other and with the master motor 60 than from five to ten percent, but with the A. C. rotors 92 fast on the several D. C. motors, and with the A. C. windings 94 connected together as shown, it follows that any out-of-phase condition of one of the rotors will be corrected by the other, and the entire series of motors 15, 15A, etc., will, for that reason, rotate at exactly the same speed, and since each engine 6 thus has a constant speed reference motor 15, 15A, etc., and a governor 12, 12A, etc., which synchronizes the engine with its reference motor 15, it follows that all engines 6 will run in substantially exact synchronism.

In the modification Fig. 2, the engines 6, the servomotor 10B and 10C, the shunt D. C. reference motors 15B and 15C, and the differential governors 12B, 12C and 12D are duplicates of units 10, 12 and 15 described with reference to Fig. 1. The mechanism 102 by which a master speed is selected and impressed on the reference motors 15B and 15C, however, is somewhat different, and comprises a master motor 104 which has a flyball governor 106, controlled by manual means 108, by which any desired speed may be selected for the master motor. It also comprises a servomotor 110 controlled by a differential governor 12D. Governor 12D includes a shaft 14 which may be an extension of the armature shaft of the master motor 104 or be attached thereto. The differential governor 12D is exactly like the governors 12B and 12C shown adjacent the engines 6 but is assigned a different reference character to avoid confusion in describing the operation of the mechanism, the differential gear-set 26 and the follow-up motor 36, as well as the pinions 16 and 20 and switches 52 and 54 being identical. The servomotor 110, however, is different from the servomotors 10, 10A, etc., in that instead of being adapted to change the pitch of a propeller it is adapted to change the position of the movable contact 111 of a rheostat 113 with respect to its resistance coil 116.

The mechanism for shifting the rheostat 113 comprises a prolongation of the armature shaft of the servomotor 110 which is threaded at 118, the thread being fitted with a nut 120. A rod 122, supported on the casing of the motor, extends slidably through a hole in the nut 120 to keep it from turning. Rotation of the threaded shaft 118, in one or the other direction, therefore moves the contact member 111 back or forth on the resistance coil 116. A shunt D. C. motor 15D, with an A. C. polyphase wound rotor, is identical with the motors 15, 15A, 15B and 15C of Figs. 1 and 2 but is assigned a different reference character to distinguish it when describing its respective functions in the mechanism. To distinguish the motor 15D from the reference motors 15B and 15C, the motor 15D may be hereinafter referred to as the master reference motor. The operation of the device of Fig. 2 is as follows:

The manually operable control 108 may be set for the desired speed and the switch 100 closed, whereby current from the battery 74 flows through the master motor 104 and through the rheostat 116 to the shunt field coils 11 of all three shunt D. C. motors 15B, 15C and 15D, the position of the contact arm 111 on the rheostat 113 determining the instant strength of the several shunt fields.

The switch 101 is now closed, whereupon current from the battery 74 will flow through the armature 13 of the D. C. reference motors 15B, 15C and the master reference motor 15D. If the motor 15D rotates faster or slower than the master motor 104, the pinion 20 will move axially one or the other direction and close one or the other of the switches 52 or 54.

Assume, for illustration, that the D. C. master reference motor 15D, viewed in the direction of the arrow 55, is rotating clockwise. The shaft 18 will then rotate anti-clockwise and the shaft 14 clockwise. If the master reference motor 15D overspeeds, the thread 22 being left-hand, the nut 20 will move right and close the switch 52, which will cause the coil 40 to be energized to rotate the servomotor 110 in the direction of the arrow 57. The thread 118 being left-hand, the nut 120 will move the arm 111 to increase the resistance to the rheostat coil 116 and thereby weaken the field 11 and bring the master reference motor 15D back down to speed. Obviously underspeeding of the motor 15D would be taken care of by the closing of the switch 54 in a similar manner.

Now since the shunt fields 11 of all three shunt D. C. motors 15B, 15C and 15D are controlled through the one rheostat 113, the governor 12D, in synchronizing the motor 15D with the master motor 104, coincidentally synchronizes the reference motors 15B and 15C with the master reference motor 15D. But since it is not safe to assume that the constant speed characteristics of the shunt D. C. motors is sufficient to maintain exact synchronism between the three D. C. motors, each motor is provided, as in Fig. 1, with an A. C. wound rotor 92, the windings of which are connected one to the other, whereby exact synchronism is had between the master motor 104, the master reference motor 15D and the reference motors 15B and 15C. From the description relating to Fig. 1, the manner in which the differential governors 12B and 12C synchronize the several engines 6 with the reference motors 15B and 15C will be readily understood.

Having described several embodiments of my invention, I claim:

1. Mechanism for synchronizing a series of direct current reference motors, which comprises, in combination, a direct current master motor for controlling the speed of said reference motors, a direct current source, a governor for controlling the current flowing from said source to said master motor, a manual means associated with said governor for setting the speed at which said governor holds said master motor, alternating current rotors, one carried on the shaft of each reference motor and one on the shaft of the master motor, said rotors having windings each connected to the others, a rheostat for controlling the current flowing from said source to the field coils of said reference motors, and operating means connecting said manual means and said rheostat, whereby the speed at which the manual means holds the master motor by means of the centrifugal governor is a function of the speed at which said rheostat holds the reference motors by means of their field coils.

2. The combination of a plurality of shunt connected direct current reference motors, a shunt connected direct current master reference motor, a master motor, a source of direct current, a rheostat, a governor for said master motor, manual means for adjusting said governor for obtaining different master motor speeds, a differential governor for synchronizing the master reference motor with the master motor, the servomotor of the said differential governor being adapted to vary the resistance through said rheostat to vary the field strength of said reference motors and said master reference motor, means for directing current from said source through said rheostat to the fields of the reference motors and the master reference motor, means for directing current from said source directly to the armatures of the reference motors and the master reference motor, and polyphase wound alternating current rotors, one carried on the shaft of each reference motor and one on the shaft of the master reference motor, said polyphase windings being connected only each to the others.

3. The combination of a plurality of reference motors, a master reference motor, a master motor, a source of current, a rheostat, manual means for setting said master motor at different speeds, a differential governor for synchronizing the master reference motor with the master motor, the servomotor of the said differential governor being adapted to vary the resistance through said rheostat to vary the field strength of said reference motors and said master reference motor, means for directing current from said source through said rheostat to the fields of the reference motors and the master reference motor, means for directing current from said source directly to the armatures of the reference motors and the master reference motor, and polyphase wound alternating current rotors, one carried on the shaft of each reference motor and one on the shaft of the master reference motor, said polyphase windings being connected only each to the others.

4. In a system which includes a plurality of reference motors to be synchronized, each with the others, and a master motor with which the speed of the reference motors are synchronized, the improvement in such a system which comprises, a plurality of direct current armatures one for each reference motor and one for the master motor, direct current shunt connected field windings, one for each reference motor, a direct current series connected field winding for the master motor, a source of direct current supply, a centrifugal governor for controlling the current flowing from said source to said master motor, a manual means associated with said centrifugal governor for setting the speed at which said centrifugal governor holds said master motor, polyphase wound alternating current rotors one mounted for unitary rotation with each said direct current armature, the polyphase windings being connected each to the others and to no other current source, an additional field winding in the master motor for its said alternating current rotor, a rheostat for controlling the current flowing from said source of direct current supply to the shunt connected field windings of the reference motors and to the said additional field winding of the master motor, and operating means connecting said manual means to said rheostat, whereby the speed at which the manual means holds the master motor, through regulation of the centrifugal governor is a function of the speed at which said rheostat holds the reference motors through regulation of said shunt field windings.

5. In a system which includes a plurality of reference motors to be synchronized, each with the others, and a master motor with which the speed of the reference motors are synchronized, the improvement in such a system which comprises, a plurality of direct current armatures one for each reference motor and one for the master motor, direct current field windings, one for each reference motor and one for the master motor, a source of direct current supply, a centrifugal governor for controlling the current flowing from said source to said master motor, a manual means associated with said centrifugal governor for setting the speed at which said centrifugal governor holds said master motor, polyphase wound alternating current rotors one mounted for unitary rotation with each said direct current armature, the polyphase windings being connected each to the others and to no other current source, an additional field winding in the master motor for its said alternating current rotor, a rheostat for controlling the current flowing from said source of direct current supply to the field windings of the reference motors and to the said additional field winding of the master motor, and operating means connecting said manual means to said rheostat, whereby the speed at which the manual means holds the master motor, through regulation of the centrifugal governor is a function of the speed at which said rheostat holds the reference motors through regulation of said shunt field windings.

6. In a system which includes a plurality of reference motors to be synchronized each with the other, and a master motor with which the speed of the reference motors are synchronized, the improvement in such a system which comprises, a plurality of direct current armatures one for each reference motor and one for the master motor, direct current field windings, one for each reference motor and one for the master motor, a source of direct current supply, a centrifugal governor for controlling the current flowing from said source to said master motor, a manual means associated with said centrifugal governor for setting the speed at which said centrifugal governor holds said master motor, polyphase wound alternating current rotors one mounted for unitary rotation with each said direct current armature the polyphase windings being connected each to the others and to no other current source, a rheostat for controlling the current flowing from said source of direct current supply to the field windings of the reference motors, and operating means connecting said manual means to said rheostat, whereby the speed at which the manual means holds the master motor, through regulation of the centrifugal governor is a function of the speed at which said rheostat holds the reference motors through regulation of said shunt field windings.

7. In a system which includes a plurality of reference motors to be synchronized each with the others, a master reference motor with which the reference motors are synchronized and a manually variable master motor with which the master reference motor is synchronized, the improvement which comprises, a plurality of direct current armatures one for each reference motor and one for the master reference motor, a plurality of direct current shunt connected field windings one for each reference motor and one for the master reference motor, a source of direct current supply, a rheostat for controlling the flow of direct current from said source of supply to the several field windings of the reference motors and of the master reference motor, a differential governor interposed between the master motor and the master reference motor sensitive to an underspeed or an overspeed condition of the master reference motor with respect to the master motor to close one or the other of two electric circuits, a servomotor operative in one or the other direction to raise or lower the resistance through said rheostat, whereby the several reference motors and the master reference motor are substantially synchronized with each other and with the master motor, and polyphase wound alternating current rotors one mounted on and for unitary rotation with each said direct current armature, the polyphase windings being connected each to the other and to no other current source, whereby the speed of the several reference motors will be exactly synchronized with the speed of the master reference motor and with each other.

8. In a system which includes a plurality of reference motors to be synchronized each with the others, a master reference motor with which the reference motors are synchronized and a manually variable master motor with which the master reference motor is synchronized, the improvement which comprises, a plurality of direct current armatures one for each reference motor and one for the master reference motor, a plurality of direct current field windings one for each reference motor and one for the master reference motor, a source of direct current supply, a rheostat for controlling the flow of direct current from said source of supply to the several field windings of the reference motors and of the master reference motor, a differential governor mechanism interposed between the master motor and the master reference motor sensitive to an underspeed or an overspeed condition of the master reference motor with respect to the master motor to move said rheostat in one or the other direction to raise or lower the resistance therethrough, whereby the several reference motors and the master reference motor are substantially synchronized with each other and with the master motor, and polyphase wound alternating current rotors one mounted on and for unitary rotation with each said direct current armature, the polyphase windings being connected each to the other and to no other current source, whereby the speed of the several reference motors will be exactly synchronized with the speed of the master reference motor and with each other.

9. In a system which includes a plurality of reference motors to be synchronized each with the others, a master reference motor with which the reference motors are synchronized and a master motor with which the master reference motor is synchronized, the improvement which comprises, a plurality of direct current armatures one for each reference motor and one for the master reference motor, a plurality of field windings one for each reference motor and one for the master reference motor, a source of current supply, a rheostat for controlling the flow of current from said source of supply to the several field windings of the reference motors and of the master reference motor, a differential governor interposed between the master motor and the master reference motor sensitive to an off speed condition of the master reference motor with respect to the master motor to adjust the resistance through said rheostat, and polyphase wound alternating current rotors one on each said direct current armature, the polyphase windings being connected only each to the other.

HOWARD M. McCOY.